April 30, 1963     D. P. THOMPSON     3,087,279
GARDEN CURB
Filed Nov. 7, 1961     2 Sheets-Sheet 1
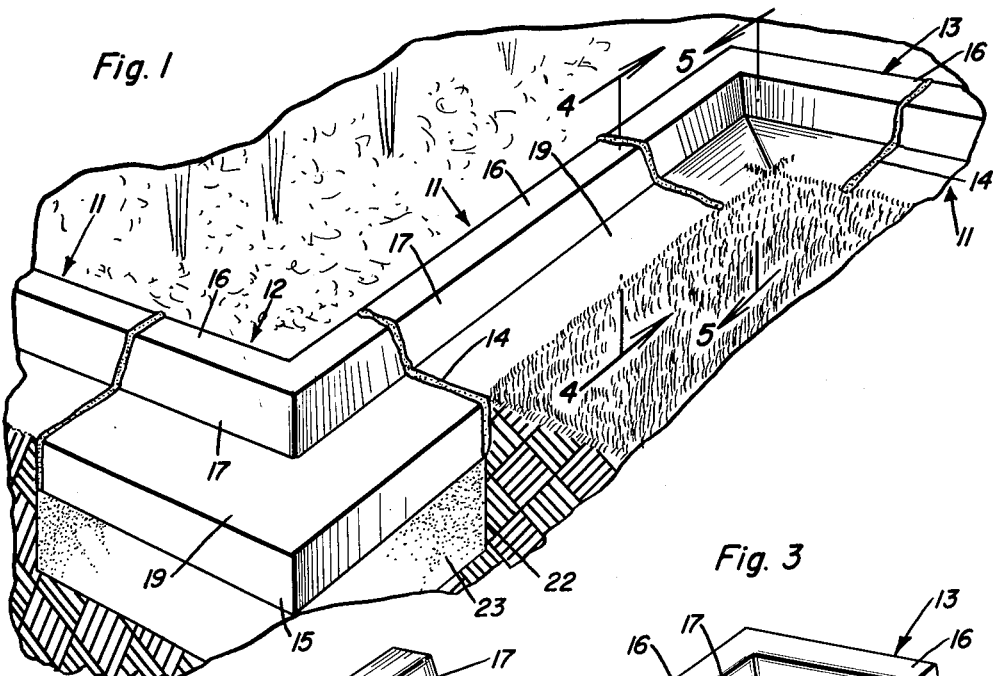
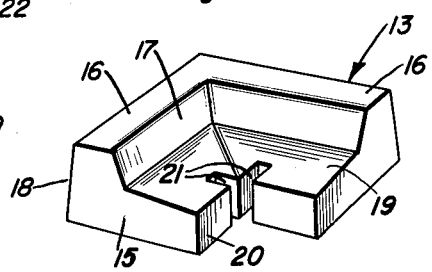
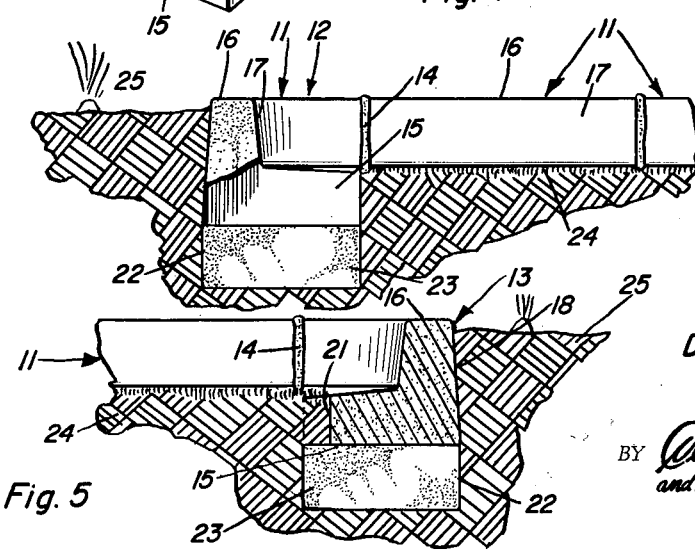
Daniel P. Thompson
INVENTOR.

April 30, 1963  D. P. THOMPSON  3,087,279
GARDEN CURB
Filed Nov. 7, 1961  2 Sheets-Sheet 2
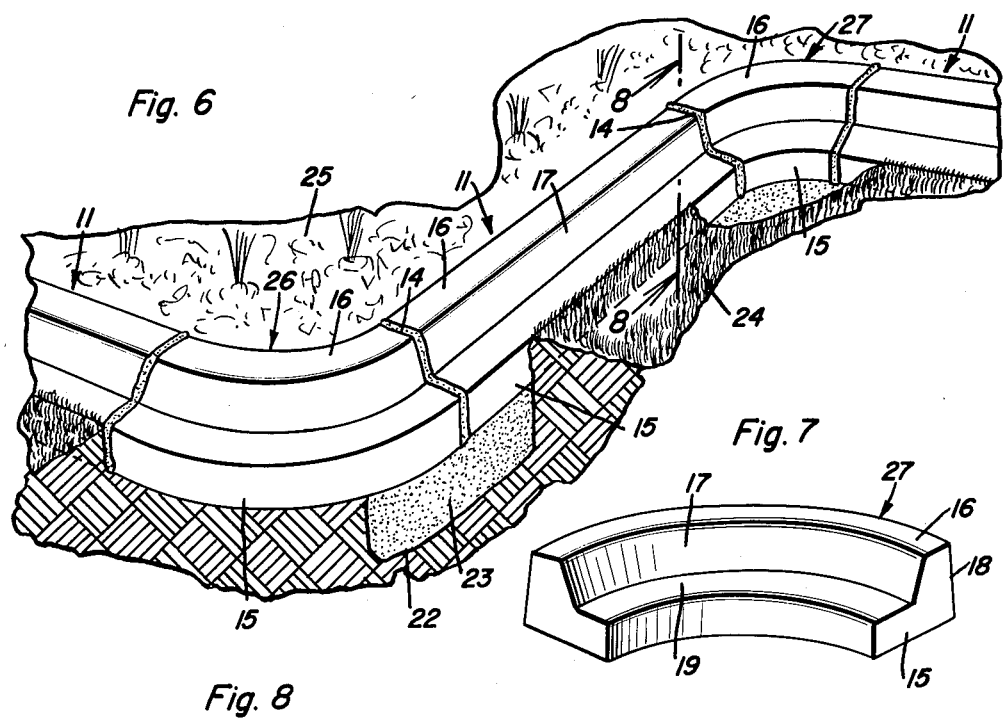
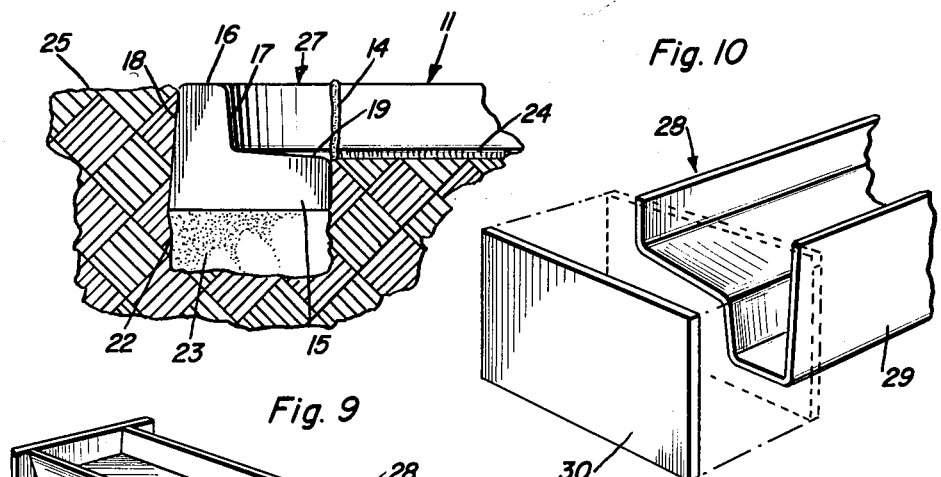
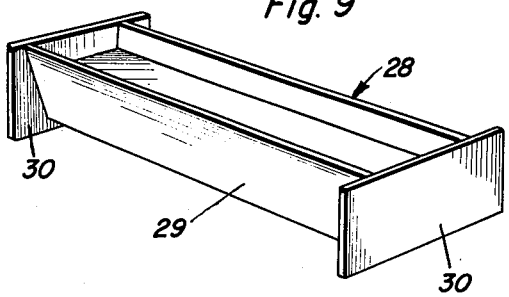
Daniel P. Thompson
INVENTOR.

3,087,279
GARDEN CURB
Daniel P. Thompson, 3221 NW. 35th Place,
Oklahoma City, Okla.
Filed Nov. 7, 1961, Ser. No. 150,760
4 Claims. (Cl. 47—33)

This invention relates to new and useful improvements in curbs or edgers particularly, although not necessarily, for flower and shrubbery beds and has for its primary object to provide novel means for spacing such beds from adjacent lawns, walls, etc., in a manner to positively prevent the encroachment of grass, weeds and other unwanted vegetation.

Another highly important object of the present invention is to provide, in a manner as hereinafter set forth, a curb of the aforementioned character which is adapted to function as a guide for a lawn mower and which, furthermore, will facilitate cutting the grass right up to the curb thereby substantially eliminating the necessity for hand trimming.

Still another important object of the invention is to provide an improved flower or shrubbery bed curb of the above stated character comprising an inside or female corner piece or block of a unique construction whereby such corners may be neatly trimmed.

Another object of the invention is to provide a flower or shrubbery bed curb of the character described which is readily adaptable to various plans or layouts.

Other objects of the invention are to provide a flower or shrubbery bed curb which will be comparatively simple in construction, strong, durable, attractive in appearance and which may be manufacured and installed at low cost and with unskilled labor.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view, showing a garden bed curb embodying the present invention installed;

FIGURE 2 is a perspective view of one of the straight blocks or sections;

FIGURE 3 is a perspective view of one of the inside or female corner blocks, sections or pieces;

FIGURE 4 is a cross-sectional view, taken substantially on the line 4—4 of FIGURE 1;

FIGURE 5 is a cross-sectional view, taken substantially on the line 5—5 of FIGURE 1;

FIGURE 6 is a perspective view of an installation comprising an arcuate or curved corner piece, section or block;

FIGURE 7 is a perspective view of one of the curved corner pieces, sections or blocks;

FIGURE 8 is a cross-sectional view, taken substantially on the line 8—8 of FIGURE 6;

FIGURE 9 is a perspective view showing a typical form in which the straight section of block may be molded; and FIGURE 10 is a perspective view of an end portion of the form, showing the end wall separated therefrom.

Referring now to the drawing in detail, it will be seen that the embodiment of the invention which has been illustrated in FIGURE 1 of said drawing comprises any desired number of straight, elongated sections or blocks 11, angulated outside or male corner sections or blocks 12, and inside or female corner sections or blocks 13. The blocks 11, 12 and 13 are of precast concrete and may be of any desired dimensions. Furthermore, the blocks 11, 12 and 13 are installed in end-opposed relation with mortar joints 14.

Each of the blocks 11, 12 and 13 includes a base portion or footings 15 having formed integrally with its rear or back portion an upstanding curb or flange 16. The curb 16 comprises a downwardly and forwardly inclined front face 17. The curb 16 further comprises a rearwardly and downwardly inclined back face 18. The top 19 of the base portion or footing 15 slopes downwardly and forwardly from the curb 16. Extending into the inside corners of the footings 15 of the blocks 13 from the front faces 20 of said footings are slots or recesses 21 the purpose of which will be presently set forth.

It is thought that the manner in which the curb functions will be readily apparent from a consideration of the foregoing. To install, a trench of appropriate dimensions is excavated, as indicated at 22. The excavation 22 is then filled to the desired level with a sand base 23. The blocks are then laid on the sand base 23 with the tops of the footings substantially flush with the surface of the ground 24. The flower or shrubbery bed, as indicated at 25, is then filled in substantially flush with the top of the curb 16. Of course, as the blocks are laid they are connected by the mortar joints 14. When one wheel of a conventional lawn mower is rolled longitudinally on the footing 15 of the installation the curb 16 functions as a guide therefor. The dimensions are such that when the mower is operated in this manner the grass is cut right up to the front of the footing 15 thereby eliminating the need for hand trimming. The slope of the top 19 of the footing ensures good drainage, preventing the accumulation of water thereon. The inclination of the front 17 of the curb 16 prevents the side of the mower wheel and the axle on which said wheel is mounted from scraping and defacing said curb. Through the medium of the inclined back face 18 of the curb the weight of the adjacent soil is utilized to prevent both vertical and lateral movement of the block. Furthermore, when the curb is installed against an existing wall or other structure the inclined back face 18 provides a space in which mortar may be conveniently poured in a continuous line for ensuring an extremely solid installation. This constitutes an important and desirable feature of the present invention. The mortar joints 14 prevent the invasion of grass and weeds at these points. The slots or notches 21 facilitate neatly trimming the inside or female corners of the installation should they be inaccessible to the mower, said slots or notches accommodating the blades of a clipper or other tool. In this connection it will be observed that the slots or notches 21 constitute continuations of the face portions 20 of the blocks 13.

In the embodiment shown in FIGURES 6, 7 and 8 of the drawing, arcuate or curved male and female corner blocks 26 and 27 are used in lieu of the angular corner blocks 12 and 13, respectively. The blocks 26 and 27, which are similar in cross-section to the blocks 11, may have any desired radius.

In FIGURES 9 and 10 of the drawing, reference numeral 28 designates generally a typical form in which the straight blocks 11, for example, may be cast. The form 28 includes a trough 29 of appropriate cross-sectional shape and dimensions, said trough being provided with end walls 30. The end walls 30, it will be noted, are substantially rectangular and project beyond the sides and bottom of the trough 29 to function as supports for the form.

The foregoing is considered as illustrative only of the principles of the invention. Further, since numerous modifications and changes will readily occur to those skilled in that art, it is not desired to limit the invention to the exact construction and operation shown and described, and accordingly all suitable modifications and equivalents may be resorted to, falling within the scope of the invention as claimed.

What is claimed as new is as follows:

1. A flower bed border comprising a right angular block defining a female corner and including an angular footing having front and rear portions and adapted to be embedded in the ground substantially flush with the surface thereof, and an upstanding angular curb on the rear footing portion, said footing having relatively right angularly extending slots extending thereinto from the front and at the angle thereof for accommodating the blades of a grass trimming implement.

2. A flower bed border in accordance with claim 1, said curb including a downwardly and rearwardly inclined back face adapted to abut and underlie the soil of a flower bed for retaining the block in position.

3. A flower bed border comprising a right angular female corner block including a right angular footing to be embedded in the ground and further including an upstanding curb on the footing, said footing including relatively right angularly extending front face portions, said footing having relatively right angularly extending, adjoining slots extending thereinto from the front thereof and longitudinally aligned with said face portions for receiving a grass trimming tool.

4. A flower bed border in accordance with claim 3, said corner block further including a rearwardly and downwardly inclined back face for underlying the opposed soil.

References Cited in the file of this patent

UNITED STATES PATENTS

| | | |
|---|---|---|
| 352,146 | Oungst | Nov. 9, 1886 |
| 1,916,494 | Schrickel | July 4, 1933 |
| 2,888,779 | Hostetter | June 2, 1959 |

FOREIGN PATENTS

| | | |
|---|---|---|
| 423,394 | France | Feb. 14, 1911 |